United States Patent
Bumgarner

(10) Patent No.: US 8,892,533 B2
(45) Date of Patent: Nov. 18, 2014

(54) ACCELERATED CACHED OBJECT RETRIEVAL

(75) Inventor: William Bumgarner, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1841 days.

(21) Appl. No.: 11/863,498

(22) Filed: Sep. 28, 2007

(65) Prior Publication Data

US 2009/0089748 A1 Apr. 2, 2009

(51) Int. Cl.
*G06F 17/30* (2006.01)
*G06F 9/44* (2006.01)

(52) U.S. Cl.
CPC ...................................... *G06F 9/443* (2013.01)
USPC .......................................... 707/702; 707/823

(58) Field of Classification Search
CPC ....................................................... G06F 17/30
USPC .................................. 707/702, 823
See application file for complete search history.

(56) References Cited

U.S. PATENT DOCUMENTS

| | | | | |
|---|---|---|---|---|
| 5,966,702 A * | 10/1999 | Fresko et al. | ........... | 707/999.001 |
| 6,031,533 A * | 2/2000 | Peddada et al. | ............... | 715/733 |
| 6,044,475 A * | 3/2000 | Chung et al. | ..................... | 714/15 |
| 6,337,689 B1 * | 1/2002 | Hochmuth et al. | ........... | 345/522 |
| 6,993,755 B1 | 1/2006 | Ungar | | |
| 7,089,272 B1 * | 8/2006 | Garthwaite et al. | .................. | 1/1 |
| 7,886,285 B2 * | 2/2011 | Asselin et al. | ................ | 717/163 |
| 2004/0230817 A1 * | 11/2004 | Ma | ................. | 713/193 |
| 2005/0060702 A1 * | 3/2005 | Bennett et al. | ..................... | 718/1 |
| 2006/0206873 A1 * | 9/2006 | Argade | ......................... | 717/135 |
| 2009/0019515 A1 * | 1/2009 | Excoffier et al. | ................. | 726/1 |

* cited by examiner

*Primary Examiner* — Son T Hoang

(74) *Attorney, Agent, or Firm* — Novak Druce Connolly Bove + Quigg LLP

(57) ABSTRACT

Efficiency of cached objects such as singleton objects and other software constructs having a first-invocation cost is improved by replacing the software code for creating a method instance (the "creation code") with the instance itself. Upon first invocation, the calling method causes the first version of the method to be performed, and also causes the first version to be replaced by the second version. Thus, the invention facilitates creation of singleton objects that run without any branch logic, so as to improve speed and efficiency. The need for locking and exception handling is reduced, resultant code is simplified, and potential for error is reduced.

8 Claims, 2 Drawing Sheets

ACCELERATED CACHED OBJECT RETRIEVAL

CROSS-REFERENCE TO RELATED APPLICATION

The present application is related to U.S. Utility patent application Ser. No. 11/760,335, filed on Jun. 8, 2007 and entitled "Scripting Bridge," the disclosure of which is incorporated herein by reference.

FIELD OF THE INVENTION

The present invention relates to object-oriented software coding, and more particularly to methods and systems for creating and retrieving cached objects such as singleton objects.

DESCRIPTION OF THE RELATED ART

Singleton objects, also referred to as singleton methods or first-invocation-initializes, are a coding pattern wherein an object type has exactly one shared instance. Singleton objects are a special case of cached objects. Conventionally, singleton objects and other cached objects are generated by creating a class with a method that creates a new instance of the class if one does not exist. If an instance already exists, the method returns a reference to that object. Accordingly, conventional techniques for such objects involve the use of conditional logic and a global variable, as follows:

```
+ sharedInstance
{
    static s = nil;
    if (s == nil) {
        s = createSingleton( );
    }
    return s;
}
```

In this example, if "s" does not yet exist, it is allocated and stored in a global variable; the global variable is then returned. This conditional logic makes singleton object generation somewhat inefficient according to prior art techniques. Use of a global variable can also add inefficiency.

Real world, modern, implementations often have a significantly more complex initialization pattern and also require the use of some kind of exclusion protocol, such as locks, to support threaded runtime environments. Thus, the following structure might be used:

```
+ sharedInstance
{
    static s = nil;
    ... lock ...
    ... set up exception handler ...
    if (s == nil) {
        s = createSingleton( );
    }
    ... finally ...
        ... unlock ...
    ... end finally
    return s;
}
```

Alternatively, some complex initialization infrastructure might be invoked prior to normal program operation. Such operations are often unreliable.

One prior art technique is to provide two versions of a method: a first version that is intended for first invocation and includes initialization code, and a second version that is intended for subsequent invocations, once all initializations have been performed. A calling method determined which version is to be called, based on whether the initializations have already run. Such a technique is inefficient because of the conditional code required in order to determine which version is to be called for each invocation. Furthermore, if any cache (or other persistent storage element) is to be made available, the cache must have global scope so that it is available to both versions of the method. In addition to being expensive and inefficient to access, global scope can cause errors resulting from the fact that the variables are made accessible to other methods and are therefore less tightly controlled.

What is needed, therefore, is a technique for improving efficiency in situations where a first-invocation cost (or other pre-initialization requirement) is incurred. What is needed, therefore, is a technique for improving efficiency in singleton generation by reducing or eliminating extraneous cost for subsequent executions. What is further needed is a technique that results in efficient code and avoids or minimizes the disadvantages of prior art techniques.

SUMMARY OF THE INVENTION

The present invention provides a system and method for reducing or eliminating the cost of subsequent executions of a method, once the first-invocation cost has been paid. In one embodiment, the system and method of the present invention create singleton objects that run without any branch logic, so as to improve speed and efficiency.

The present invention operates by replacing the software code for creating a method instance (the "creation code") with the instance itself. In this manner, subsequent executions of the method need not pay the extraneous cost associated with executing the creation code.

Upon first invocation by the calling method, the first version of the method is performed, and the first version is replaced by the second version. The replacement of the first version by the second version is entirely invisible to the calling method, a significant advantage. The calling method or calling methods, in a multithreaded case, have no awareness that any such change is happening other than that later invocations take place much faster due to the streamlined second version of the method.

BRIEF DESCRIPTION OF THE DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

DETAILED DESCRIPTION OF THE EMBODIMENTS

Figure 1:
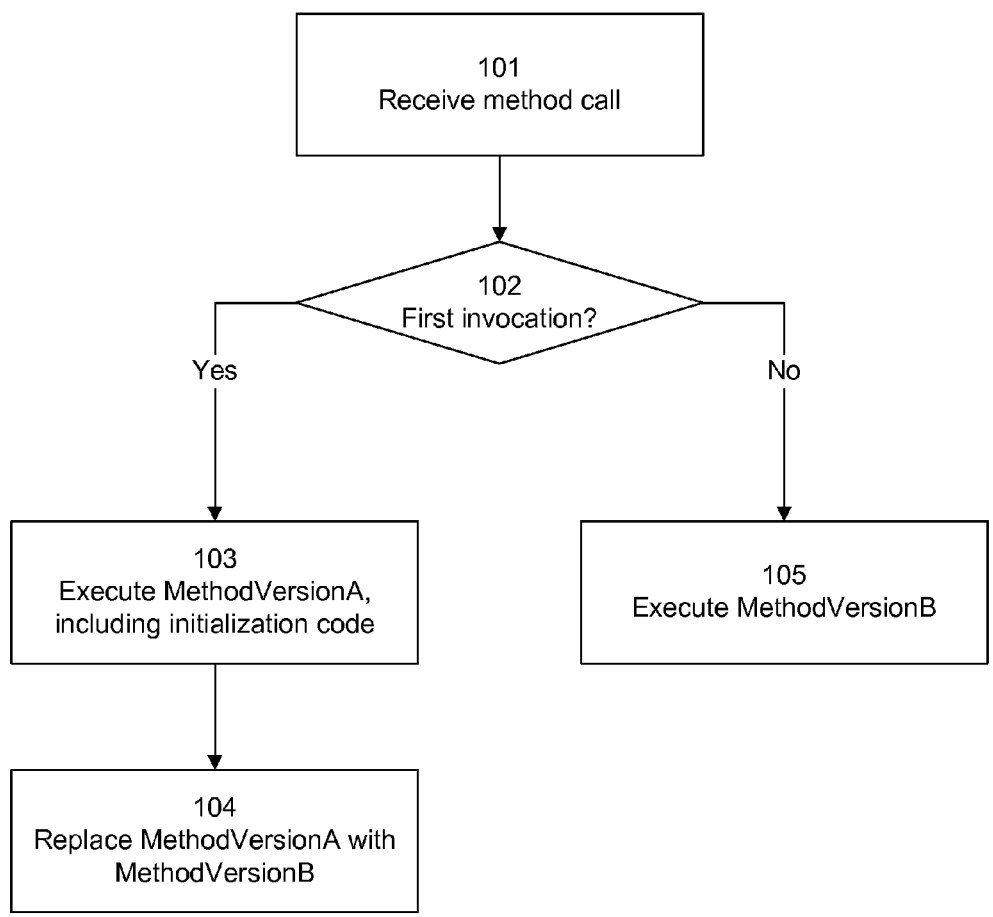
FIG. 1 is a flowchart depicting a method for implementing the present invention according to one embodiment.

For purposes of the following description, "cost" refers to any resource that is consumed in the execution of software code. For example, cost includes processing time, bandwidth, memory usage, storage space, and/or any combination thereof. In most contexts in the description below, "cost" most directly refers to the processing time involved with executing software code. Accordingly, the present invention provides mechanisms for reducing this processing time (and/or possibly other resource usage) by improving efficiency.

The present invention provides techniques that can be used in connection with method calls written in a language such as Objective-C. In one embodiment, the present invention is implemented in connection with software code running on an operating system such as Mac OS® X. One skilled in the art will recognize that the particular framework, structure, classes, and arrangements described herein are merely exemplary, and that many variations are possible without departing from the essential characteristics of the present invention. In particular, applicability is not limited to Objective-C nor even object-oriented programming: the present invention can be implemented in the context of any relatively dynamic runtime that allows the implementation of a method or function to be replaced by another without knowledge of the calling method or function.

In addition, in the following description the invention is set forth in the context of singleton object creation and retrieval. However, one skilled in the art will recognize that the invention can be used in any context where a cached object is created and later retrieved. Accordingly, references herein to singleton objects are not intended to limit the scope of the invention.

According to the present invention software code for creating a method instance (the "creation code") is replaced with the instance itself. In this manner, subsequent executions of the method need not pay the extraneous cost associated with executing the creation code.

Upon first invocation by the calling method, the first version of the method is performed, and the first version is replaced by the second version. The replacement of the first version by the second version is entirely invisible to the calling method, a significant advantage. The calling method or calling methods, in a multithreaded case, have no awareness that any such change is happening other than that later invocations take place much faster due to the streamlined second version of the method.

In one embodiment, the method of the present invention implements with full locking, exception handling, and any other correctness verifying measures and with one additional step wherein the method that retrieves the singleton is replaced with a new implementation that carries the singleton as a part of the implementation, as follows:

```
+ sharedInstance
{
    static id s;
    ... lock ...
    if (s) return s;
    ... set up exception handler ...
    id s = createSingleton( );
    ... replace +sharedInstance implementation with optimal, non-locking,
    version that simply returns 's' directly ...
        ... finally ...
            ... unlock ...
        ... end finally
        return s;
```

During initialization, any other callers will block on the lock operation until initialization is done. Once the lock is unlocked, any blocked callers will short circuit out on the if(s) statement (unlocking in the ... finally ... block), but all future callers will execute the faster replacement implementation. The replaced code is simply:

```
+ sharedInstance
{
    return s;
}
``` where 's' has been preset to be a reference to the cached object that must be quickly retrieved.

An example of code for implementing the above is:

```
+ (id) getSingleton
{
    local s = makeThing( );
    IMP method_implementation =
makeImplementationReturningConstantObject(s);
        class_addMethod([self class], @selector(getSingleton),
    method_implementation);
        return s;
}
```

The first time through, the method allocates s and creates a new method implementation to return that object. It then replaces itself with that new method. This new method works without any conditional logic at all. This saves time, and also avoids the use of the global variable access. It also allows the creation of the singleton to be fully thread-safe and completely protected. A further advantage is that the retrieval of the singleton after first execution does not require any locks, exception handling, or concurrency constructs.

Referring now to FIG. 1, there is shown a flowchart depicting a method for implementing the present invention according to one embodiment. A method call is received 101 for an object (such as a cached object) that has a first-invocation cost. If this is the first time the method is being invoked 102, a first version of the method (denoted MethodVersionA) is executed 103. MethodVersionA includes initialization code that is needed for first invocation of the method. Once MethodVersionA has been run, it is replaced 104 with a second version of the method, MethodVersionB. MethodVersionB is a faster, more efficient version that does not include initialization code or other code that is needed for first invocation only. The code for causing the replacement to take place can be part of MethodVersionA itself, or it can be part of a calling method or any other method. In one embodiment, the software code for both method versions are initially provided, but the code is replaced with MethodVersionB once the first invocation has taken place.

Subsequently, when a method call is received 101 and it is not the first invocation 102, MethodVersionB is automatically executed 105.

FIG. 1 depicts a conceptual overview of the method of the invention. In one embodiment, there is no explicit condition being evaluated at step 102. Rather, the replacement of MethodVersionA with the more efficient MethodVersionB causes MethodVersionB to automatically be executed when appropriate (i.e., on all invocations after the first), with no need for a condition to be evaluated. Thus, the present invention provides a technique whereby no additional conditional steps need be performed in order to ensure that the more efficient available version of the method is executed when it is appropriate to do so.

Figure 2A:
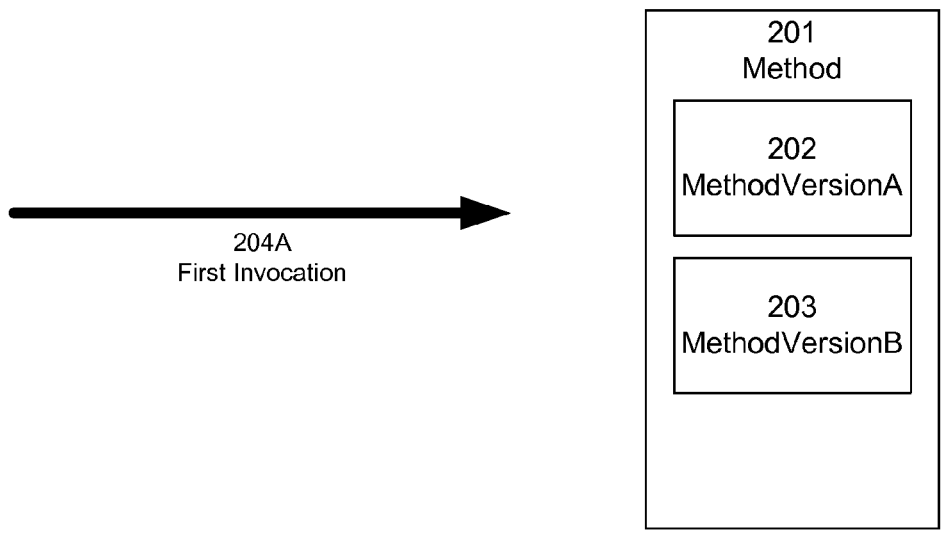
FIGS. 2A and 2B are block diagrams depicting method configuration during a first and subsequent invocation, respectively.
Figure 2B:
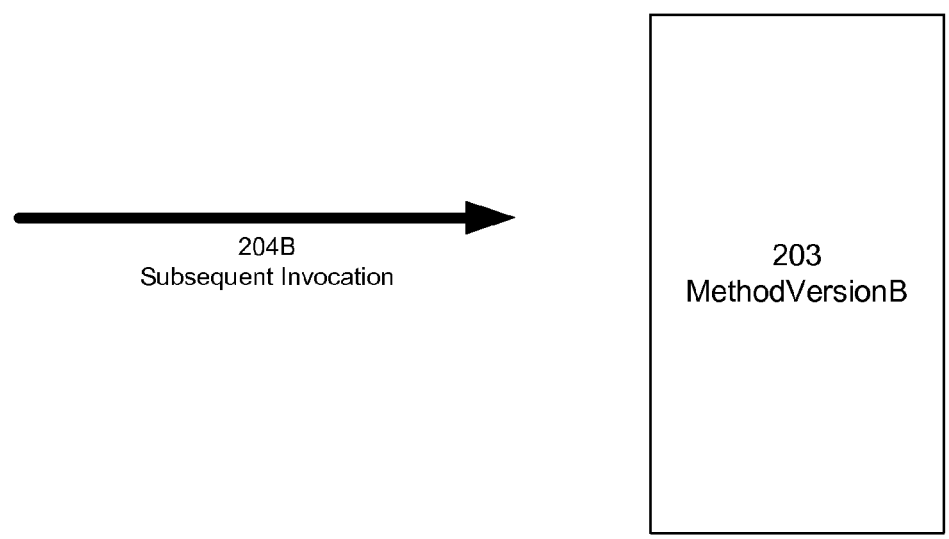

Referring now to FIGS. 2A and 2B there are shown block diagrams depicting method configuration during a first and subsequent invocation, respectively. In FIG. 2A, a first-invocation method call 204A is received. Method 201 has not yet been initialized. MethodVersionA code 202 is executed; this code 202 includes all necessary initialization steps for first invocation of the method. In addition, MethodVersionA code 202 (and, in one embodiment, any other extraneous code in method 201) is replaced by MethodVersionB code 203. Thus, for subsequent invocations as shown in FIG. 2B, when subsequent invocation method call 204B is received, MethodVersionB code 203 is automatically executed, without any need for conditional evaluations.

In one embodiment, MethodVersionA code 202 is deleted after the first invocation. In another embodiment, MethodVersionA code 202 is not actually deleted, but is just tagged so that it is not accessible. Alternatively, a pointer can be provided to reference MethodVersionA code 202, and can be modified after first invocation to reference MethodVersionB code 203. In this manner, MethodVersionB code 203 can be executed automatically as described above without requiring deletion of MethodVersionA code 202. Saving MethodVersionA code 202 may be useful for backup, archival, or debugging purposes, for example.

The present invention can be implemented, for example, in connection with a scripting bridge as described in related U.S. Utility patent application Ser. No. 11/760,335, filed on Jun. 8, 2007 and entitled "Scripting Bridge," the disclosure of which is incorporated herein by reference. The following description of such an implementation is provided for illustrative purposes, and is not intended to limit the scope of the invention in any way. One skilled in the art will recognize that the present invention can be implemented in many other contexts.

As described in the related patent application, a scripting bridge allows a developer to automatically build glue classes to access a scriptable application with standard method calls written in a language such as Objective-C. A dictionary is provided to map certain action handles (such as "play", "stop", and the like) with numbers so that terms in the software code will be understood by the target application.

In general, the dictionary needs to be accessible in dynamically generated classes. For example, a class may be provided, including a method called verbToCommandID (String*) verbName, which looks up action handles in the dictionary and returns associated numbers. Such a class would require access to the dictionary in order to function.

On first invocation of the verbToCommandID method, the dictionary does not exist. Accordingly, code is provided to obtain the needed data and populate a cache that forms the dictionary. Because the dictionary needs to be accessible to different methods, a lock is performed prior to populating the cache. Accordingly, the pseudo-code for initial invocation might read as follows:

```
(NSString *) verbToCommandID: (String*)verbName; { @try
[exception handling] {lock( )}
if(cacheDoesNotExist) {
    ... . obtain needed data...
    ... . populate cache ...
}
...catch exceptions...
return lookupInCache(cache, verbName);
}
```

Recognizing that the lock operation and perhaps other elements of the initial-invocation code are not needed for subsequent invocations, it is beneficial to replace the above-described method with a more efficient version once the initial invocation has taken place. Accordingly, the present invention includes code that causes the verbToCommandID method to be replaced with a more efficient version that omits unnecessary operations such as locking, exception handling, and the like.

```
(NSString *) verbToCommandID: (String*)verbName; { @try
[exception handling] {lock( )}
if(cacheDoesNotExist) {
    ... . obtain needed data...
    ... . populate cache ...
    ... replace method with initialized cache ...
}
...catch exceptions...
return lookupInCache(cache, verbName);
}
```

An example of replacement code that is capable of handling subsequent invocations (once the cache has been initialized) is:

```
(NSString *) verbToCommandID: (String*)verbName; {
    return lookUpInCache(s, verbName);
}
``` where 's' is preset to be a reference to the cache (as before).

In one embodiment, a reference to the initialized cache is included in the newly created fastlookup method, so as to further improve efficiency. The state is therefore stored within the method itself.

For example, when the method implementation is dynamically created, it includes executable code and some data that is used in that execution. The implementation itself stores the data to be cached for later rapid access.

The following is an example of code for replacing an implementation of a shared instance method with a new implementation that directly returns a shared instance that has been cached away. One skilled in the art will recognize that this example presents merely one possible embodiment of the present invention.

```
static void noargs_cached_object_tramp(ffi_cif* cif, void* result,
void** args, void* userdata) {
    noargs_cached_object_tramp_context *context =
(noargs_cached_object_tramp_context *)userdata;
    *((id*) result) = (id) context->_cachedObject;
}
static void class_replaceMethodReturningCachedObject(Class klass, SEL
_cmd, id objectToCache) {
    noargs_cached_object_tramp_context *context =
(noargs_cached_object_tramp_context *) calloc(1,
sizeof(noargs_cached_object_tramp_context));
    context->_resultType = &ffi_type_pointer; // return (id)
    context->_argTypes = (ffi_type **)calloc(2, sizeof(ffi_type*));
    context->_argTypes[0] = &ffi_type_pointer; // arg: self
    context->_argTypes[1] = &ffi_type_pointer; // arg: _cmd
    context->_cachedObject = (id) objectToCache;
    if (ffi_prep_cif(&context->_methodInfo, FFI_DEFAULT_ABI,
2, context->_resultType, context->_argTypes) != FFI_OK) {
        NSLog(@"blarf -- ffi_prep_cif( ) failed. Ouch. Good luck.");
    }
    if (ffi_prep_closure(&context->_closure, &context->_methodInfo,
noargs_cached_object_tramp, context) != FFI_OK) {
        NSLog(@"blarf -- ffi_prep_closure( ) failed. Ouch. Good
luck.");
    }
    Method method = class_getClassMethod(klass, _cmd);
    method_setImplementation(method, (IMP) &context->_closure);
}
```

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a de-sired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A programming environment including executable code for implementing a method for optimizing object generation, the method comprising:
    receiving, from a calling method, a first call for invocation of a target method including initialization code;
    executing a first code version to perform the target method;
    in response to the first code version executing successfully with no exceptions, the first code version dynamically replaces the first code version with a second code version to perform the target method in any subsequent invocations of the target method, wherein
        the second code version does not include the initialization code, and
        the dynamically replacing is performed without notification to the calling method;
    receiving, from the calling method, a second call for invocation of the target method; and
    in response to the second call, executing the second code version to perform the target method, the second code version comprises a singleton object wherein each object type of the singleton object has exactly one shared instance.

2. The programming environment of claim 1, wherein replacing the first code version with the second code version further comprises:
    deleting the entire first code version.

3. The programming environment of claim 1, wherein the replacing the first code version with the second code version further comprises:

updating a pointer associated with the first code version to provide reference to the second code version.

4. The programming environment of claim 1, wherein the replacing the first code version with the second code version comprises:
marking the first code version to indicate that the first code version is not accessible.

5. A non-transitory computer-readable medium having code stored thereon for causing a computer to perform a method for optimizing object generation, the method comprising:
receiving, from a calling method, a first call for invocation of a target method including initialization code;
executing a first code version to perform the target method;
in response to the first code version executing successfully with no exceptions, the first code version dynamically replaces the first code version with a second code version to perform the target method in any subsequent invocations of the target method, wherein
the second code version does not include the initialization code, and
the dynamically replacing is performed without notification to the calling method;
receiving, from the calling method, a second call for invocation of the target method; and
in response to the second call, executing the second code version to perform the target method, the second code version comprises a singleton object wherein each object type of the singleton object has exactly one shared instance.

6. The non-transitory computer-readable medium claim 5, wherein the replacing the first code version with the second code version further comprises:
deleting the entire first code version.

7. The non-transitory computer-readable medium of claim 5, wherein the replacing the first code version with the second code version further comprises:
updating a pointer to provide reference to the second code version.

8. The non-transitory computer-readable medium of claim 5, wherein the replacing the first code version with the second code version comprises:
marking the first code version to indicate that the first code version is not accessible.

\* \* \* \* \*